(12) United States Patent
Yanagida

(10) Patent No.: US 6,903,159 B2
(45) Date of Patent: Jun. 7, 2005

(54) METHOD FOR PRODUCING SAPONIFIED ETHYLENE-VINYL ACETATE COPOLYMER

(75) Inventor: Noboru Yanagida, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 28 days.

(21) Appl. No.: 09/933,839

(22) Filed: Aug. 22, 2001

(65) Prior Publication Data

US 2002/0032267 A1 Mar. 14, 2002

(30) Foreign Application Priority Data

Aug. 31, 2000 (JP) ......................................... 2000-262691

(51) Int. Cl.⁷ .............................. C08F 8/00; C08F 8/12; C08G 63/91
(52) U.S. Cl. .......................................... 525/61; 525/56
(58) Field of Search ..................................... 525/61, 56

(56) References Cited

U.S. PATENT DOCUMENTS

| | | | | |
|---|---|---|---|---|
| 1,897,856 A | * | 2/1933 | Noller | 525/62 |
| 2,467,774 A | * | 4/1949 | Plambeck, Jr. | 525/62 |
| 2,640,816 A | | 6/1953 | Germain | |
| 3,050,508 A | * | 8/1962 | Starck et al. | 525/62 |
| 3,344,129 A | * | 9/1967 | Bestian et al. | 525/62 |
| 3,386,978 A | * | 6/1968 | Salyer | 525/62 |
| 3,523,933 A | * | 8/1970 | Inskip | 525/62 |
| 3,544,538 A | | 12/1970 | Masuda et al. | |
| 3,560,461 A | | 2/1971 | Yonezu et al. | |
| 3,847,845 A | * | 11/1974 | Tada et al. | 521/63 |
| 3,985,719 A | * | 10/1976 | Hoyt et al. | 525/62 |
| 4,377,621 A | * | 3/1983 | Hart et al. | 428/425.8 |
| 4,611,029 A | | 9/1986 | Takahashi | |
| 4,614,781 A | * | 9/1986 | Hori et al. | 525/330.6 |
| 4,719,259 A | * | 1/1988 | Jenkins | 525/60 |
| 5,744,547 A | * | 4/1998 | Moritani et al. | 525/62 |
| 6,288,165 B1 | * | 9/2001 | Moritani et al. | 525/59 |

FOREIGN PATENT DOCUMENTS

| | | |
|---|---|---|
| EP | 0 054 716 | 6/1982 |
| EP | 0 067 021 | 12/1982 |
| EP | 0 145 928 | 6/1985 |
| EP | 0 363 813 | 2/1994 |
| FR | 1 576 427 | 8/1969 |
| GB | 1172967 | 12/1969 |
| JP | 43-14958 | 6/1968 |
| JP | 58-122903 | 7/1983 |
| JP | 61-4752 | 1/1986 |
| JP | 2-192939 | 7/1990 |
| JP | 6-345811 | 12/1994 |

OTHER PUBLICATIONS

Chemical Abstracts, CS 266,273, Jul. 13, 1990.

* cited by examiner

*Primary Examiner*—Judy M. Reddick
(74) *Attorney, Agent, or Firm*—Oblon, Spivak, McClelland, Maier & Neustadt, P.C.

(57) ABSTRACT

A method for producing a saponified ethylene-vinyl acetate copolymer which comprises saponifying an ethylene-vinyl acetate copolymer in an alcohol-based solvent with an alkali catalyst, wherein an amount between 100 ppm and 15,000 ppm of water with respect to the ethylene-vinyl acetate copolymer is supplied into the alcohol-based solvent. According to this method, discoloration, etc. of a saponified ethylene-vinyl acetate copolymer is inhibited, and visual characteristics of the saponified copolymer are improved.

6 Claims, 1 Drawing Sheet

METHOD FOR PRODUCING SAPONIFIED ETHYLENE-VINYL ACETATE COPOLYMER

FIELD OF THE INVENTION

The present invention relates to a method for producing a saponified ethylene-vinyl acetate copolymer (hereinafter abbreviated as "EVOH").

DESCRIPTION OF THE PRIOR ART

An EVOH is excellent in melt moldability, gas barrier properties, oil resistance, antistatic property and mechanical strength, and are used as various types of packages in the form of a film, a sheet, a container or the like. In these packages, visible imperfections generated at the time of molding, e.g. discoloration, fish eyes, rough surface, etc., are significant problems that need to be addressed. Thus, several improvements in the process of producing an EVOH have been proposed.

In a process of saponification of an ethylene-vinyl acetate copolymer (hereinafter abbreviated as "EVAc"), usually an alkali catalyst is used. The alkali catalyst acts as a catalyst for the transesterification between the EVAc and an alcohol. It is known that, in a process where saponification proceeds mainly with this transesterification, when water is present in the reaction system, the alkali catalyst is consumed, and the reaction rate of the saponification decreases. This is because while water accelerates the direct saponification reaction between the EVAc and the alkali catalyst, it also accelerates the reaction between an acetic acid ester formed as a by-product in the above transesterification and the alkali catalyst. Thus, conventionally, attempts to address this problem have focused exclusively on the removal of water from the reaction system. However, the inventor has now discovered that this results in visible imperfections in products molded from the EVOH.

DISCLOSURE OF THE INVENTION

It is therefore desirable to further inhibit visual imperfections of an EVOH molded product by improving to the EVOH saponification process.

The inventor has surprisingly found that the appearance of an EVOH molded product can be improved by adding a trace amount of water, which has conventionally been removed as a catalyst poison.

That is, the present invention provides a method for producing an EVOH, which comprises saponifying an EVAc in an alcohol-based solvent with an alkali catalyst, wherein an amount between 100 ppm and 15,000 ppm (by weight throughout, unless otherwise stated) of water with respect to the EVAc is supplied into the alcohol-based solvent. According to this method, visual characteristics of an EVOH molded product can be improved without extensive modification to the saponification process.

The mechanism by which water improves the appearance of the EVOH is not necessarily clear at the present. Whilst not wishing to be bound by theory, the added water is believed to prevent local formation of a strongly basic region during the reaction. When the water content is too low, the above effect is not obtained sufficiently. When the water content is excessive, the alkali catalyst is consumed, and the rate of the saponification is decreased.

In the above method, it is preferable that a first solution comprising an EVAc and an alcohol-based solvent and a second solution comprising an alkali catalyst and an alcohol-based solvent are introduced into a saponification reaction column (tower type apparatus), each through an upper portion thereof, and a vapor of an alcohol-based solvent is introduced into the saponification reaction column through a lower portion thereof. In this method, the EVOH can be taken out of the column through a lower portion thereof while removing a by-product (e.g. acetic acid ester) through an upper portion of the column with the vapor of the alcohol-based solvent. Thus, saponification can be carried out efficiently while removing the by-product that consumes the alkali catalyst.

In the above method, it is preferable that water is fed into the saponification reaction column with the second solution. By feeding water with the alkali catalyst and the alcohol-based solvent, the water content can be controlled by simple operations.

In the above method, it is preferable that the EVAc is saponified until its saponification degree is at least 90 mol %. When a higher saponification degree is required, the water content may be adjusted. That is, in the above method, an amount between 100 ppm and 3000 ppm of water may be included with respect to the EVAc, and the EVAc may be saponified until its saponification degree is at least 98 mol %, more preferably at least 99 mol %.

As described above, water accelerates consumption of an alkali catalyst. Thus, while improving the appearances of an EVOH molded product, its saponification degree can be controlled by adjusting the amount of water added. That is, by adding between 1000 ppm and 15,000 ppm of water with respect to the EVAc, and stopping the saponification of the EVAc by consumption of the alkali catalyst as accelerated by the presence of the water, an EVOH having a saponification degree of 90 mol % to 98 mol % can be obtained. According to this preferred embodiment, the final saponification degree of the EVOH can be controlled easily.

In the above method, it is preferable that the ethylene content in the EVAc is between 20 mol % and 70 mol %. When the ethylene content is too low, the water resistance of the EVOH molded product is decreased. When the ethylene content is too high, the gas barrier properties of the EVOH molded product are decreased. It is more preferable that the ethylene content is at least 25 mol %, particularly preferably not more than 55 mol %. When it is used as a coating material or the like, the ethylene content may be less than 20 mol %.

DESCRIPTION OF THE PREFERRED EMBODIMENT

Figure 1:
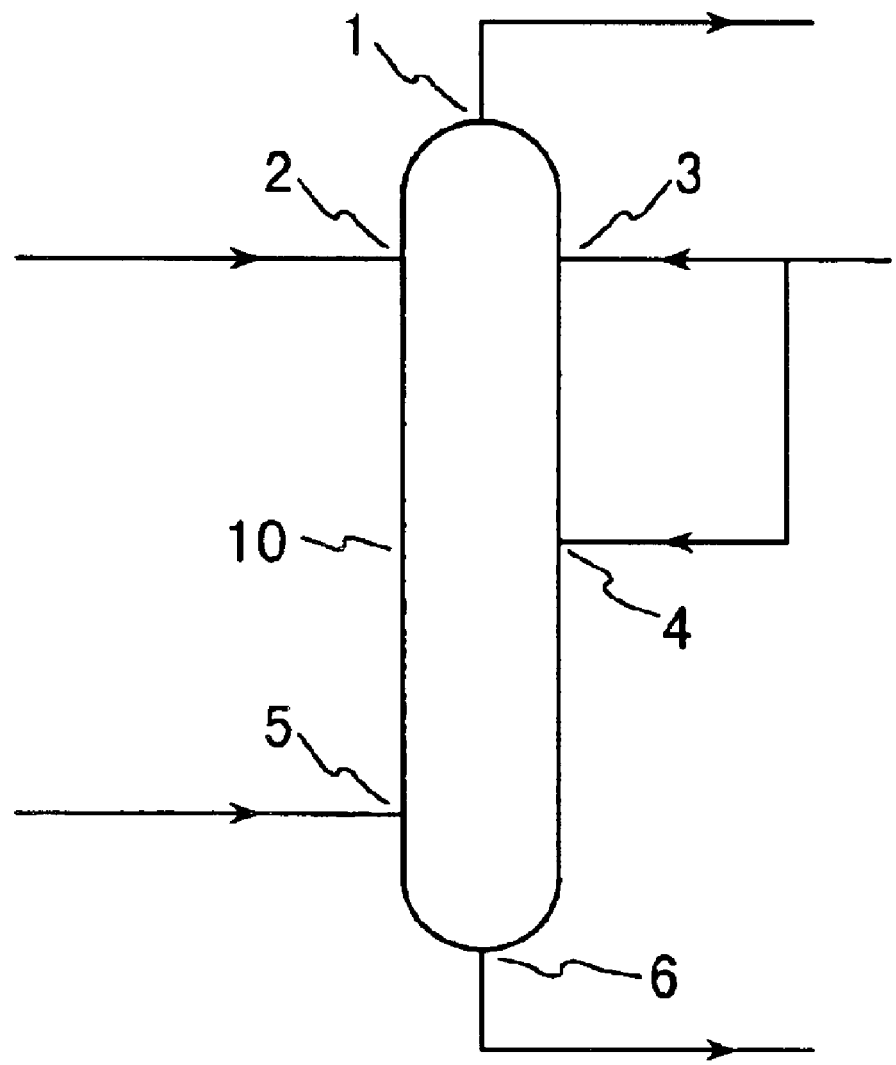
FIG. 1 shows an example of a saponification reaction column for carrying out the method of the present invention.

In the following, a preferred embodiment of the present invention is described.

Water is fed into a saponification reaction column in an amount of 100 to 15,000 ppm with respect to the EVAc. Though depending on the desired saponification degree, in general, the water content is preferably from 300 to 10,000 ppm, particularly preferably from 500 to 8000 ppm.

As the alcohol-based solvent, alcohols having 1 to 4 carbon atoms such as methanol, ethanol, n-butanol and t-butanol are suitable, and methanol is particularly suitable. A mixed solvent of two or more alcohols also may be used. As the alkali catalyst, sodium hydroxide, potassium hydroxide, alkaline metal alcoholate (e.g. sodium methylate) or the like may be used.

The EVAc to be saponified can be produced by copolymerizing ethylene and vinyl acetate according to a conventional method. Although there is no limitation to the polymerization method, solvent, etc., solution polymerization using methanol as a solvent is suitable. As a polymerization catalyst, a radical initiator, e.g., various types of azonitrile-based initiators or organic peroxide-based initiators, may be used. Furthermore, a third monomer (e.g. a-olefins such as propylene, unsaturated acids such as acrylic acid, various kinds of nitrites, various kinds of amides) copolymerizable with ethylene and vinyl acetate also may be present in the EVAc. It is preferable that the third monomer is present in an amount which does not inhibit the effect of the present invention.

It is preferable that the saponification is carried out using a saponification reaction column. An example of saponification using the column is described with reference to FIG. 1. A methanol solution of an EVAc and a methanol solution of sodium hydroxide are fed into a saponification reaction column 10 through upper portions 2 and 3 thereof, respectively. Furthermore, a vapor of methanol is blown into the saponification reaction column 10 through a lower portion 5 thereof. While removing methyl acetate formed as a by-product through a top portion 1 of the column, saponification of the EVAc proceeds, and an EVOH is obtained through a bottom portion 6 of the column with methanol. In this way, consumption of the alkali catalyst (sodium hydroxide) is inhibited by distilling methyl acetate with the vapor of methanol.

Water may be introduced into the column with the methanol solution of sodium hydroxide, the methanol solution of the EVAc, or the vapor of methanol. Or water may be fed into the column separately from methanol. Among these methods, in view of the improvement in the accuracy of the water content, the methods in which water is introduced into the column with the methanol solution of sodium hydroxide or the methanol solution of the EVAc are preferred. The method in which water is introduced into the column with the methanol solution of the EVAc is favorable in that the time for mixing the methanol solution of the EVAc with water can be chosen freely. On the other hand, this method causes extra labor required for the mixing because of the relatively high viscosity of the solution. To avoid this problem and allow accurate control of the water content by simple operation, the method in which water is introduced with the methanol solution of sodium hydroxide is particularly preferred. Although it differs depending on the ethylene content in the EVAc fed for saponification or other conditions of production, it is preferable that the water content in the methanol solution of sodium hydroxide is approximately in the range of 0.1 to 10 wt %.

Sodium hydroxide may be fed into the column from a plurality of positions (heights). For example, as shown in FIG. 1, sodium hydroxide can be introduced into the column through a middle portion 4 of the column in addition to the upper portion 3.

Although it depends on the ethylene content, EVOH is difficult to dissolve in methanol under atmospheric pressure. To inhibit adhesion of polymer scale and allow a continuous operation for a long time, it is preferable that the pressure in the saponification reaction column is in the range of 0.1 MPa to 1.0 MPa. Furthermore, for similar reasons and in order to increase the reaction rate of saponification, it is preferable that the temperature in the column is from 60° C. to 150° C.

Particularly, when carrying out continuous saponification using a saponification reaction column, it is desirable to adjust the concentration of EVAc so that the viscosity of the solution in the saponification reaction column is not too high. It is preferable that the concentration of the EVAc in the methanol solution fed into the column is from 30 wt % to 60 wt %.

The amount of the alkali catalyst (sodium hydroxide) added may be adjusted depending on the ethylene content in the EVAc, the saponification degree to be obtained, etc. In general, when it is intended to obtain a saponification degree of at least 90 mol %, it is preferable that the amount of the alkali catalyst added is from 0.5 to 20 mol % with respect to the acetic acid ester component of the EVAc.

The amount of the vapor of methanol blown into the column may be selected from a range such that methyl acetate formed as a by-product can be removed almost completely. Furthermore, for example, the temperature of the vapor may be the boiling point of methanol under the pressure in the column. It is preferable that, for example, the amount of the vapor of methanol blown into the column is approximately from 1 to 10 weight parts with respect to 1 weight part of the EVAc.

According to the above method using a saponification reaction column, an EVOH having a high saponification degree can be obtained by a continuous saponification in a single saponification reaction column. The present invention also can be applied to the production of a partially saponified product in which the saponification degree is limited to the above-mentioned range. In the process of obtaining a partially saponified product, it is preferable that the saponification degree is controlled with the water content by the above-described method. This control has an advantage in that the obtained EVOH has a narrower saponification distribution compared with conventional methods.

Because a partially saponified product has an adhesive quality, it can be used alone as an intermediate layer of a multi-layer structure. It also can give an adhesive quality to a fully saponified product by co-blending. In addition, a partially saponified product may be saponified further to form a final saponified product. A partially saponified product may be saponified in an alcohol-based solvent, or may be saponified in an aqueous solution of an alkali catalyst.

It is preferable that the melt index (MI) of the EVOH is from 0.1 to 200 g/10 min. As the MI, a value measured at 190° C. and under a load of 2160 g is used. However, with respect to an EVOH having a melting point of around 190° C. or exceeding 190° C., a plurality of measured values under the above-specified load and at temperatures of not less than the melting point are plotted as a semi-logarithmic graph with the inverse of the absolute temperature on the horizontal axis and MI on the vertical axis (logarithmic scale), and a value extrapolated at 190° C. is used as the MI.

Usually, the EVOH obtained by saponification is extruded further into a coagulation bath comprising water or a mixture of water and methanol, and cut into pellets. These pellets are washed, deliquored, and treated with a boron compound, a carboxylic acid compound, a phosphoric acid compound, etc. as appropriate. By including these compounds, mechanical properties, thermal stability, and the like of an EVOH molded product can be improved. The use of a solvent containing a trace amount of water can improve the visual characteristics of the pellets. The yellow index of the pellets can be lowered to 28 or less, preferably 25 or less, more preferably 20 or less.

The thus obtained EVOH may be molded into various forms such as films, sheets, containers, pipes, fibers and the like by melt molding. Melt molding may be effected by extrusion molding, inflation, blow molding, melt spinning, injection molding, etc. It is preferable that the melting temperature is from 150° C. to 270° C. A blend of at least two kinds of EVOH different in polymerization degree, ethylene content, saponification degree and the like may be melt molded. Furthermore, plasticizers, stabilizers, surfactants, crosslinking agents, metal salts, fillers, reinforcing agents such as various types of fibers, etc. may be added to the EVOH in advance.

A thermoplastic resin other than EVOH may be mixed with the EVOH. Examples of the thermoplastic resin include polyolefins (polyethylene, polypropylene, poly-1-butene, poly-4-methyl-1-pentene, ethylene-propylene copolymers, copolymers of ethylene and an α-olefin having at least 4 carbon atoms, copolymers of a polyolefin and maleic anhydride, ethylene-vinyl acetate copolymers, ethylene-acrylic acid ester copolymers, modified polyolefins in which these polyolefins are grafted with an unsaturated carboxylic acid or its derivative, etc.), various types of nylons (nylon 6, nylon 66, nylon 6/nylon 66 copolymers, etc.), polyvinyl chloride, polyvinylidene chloride, polyester, polystyrene, polyacrylonitrile, polyurethane, polyacetal, modified polyvinyl alcohol resin, and the like.

Furthermore, the EVOH may be formed into a laminate, for example, by coextruding the EVOH with a thermoplastic resin such as those exemplified above. Furthermore, the EVOH may be formed into a laminate with a substrate film such as paper, plastic film, metal foil or the like, and may be coated on the surface of these substrate films by coextrusion coating, solution coating or the like.

EXAMPLES

In the following, the present invention will be described in more detail with reference to the following non-limiting examples.

Example 1

A bubble-cap tower having a diameter of 0.85 m and 20 sections (plates) was used as a saponification reaction column. A methanol solution of EVAc (ethylene content in the EVAc: 32 mol %, EVAc concentration in the solution: 45 wt %) and a methanol solution of sodium hydroxide containing water (sodium hydroxide concentration: 15 wt %, water content: 1.74 wt %) were fed into this bubble-cap tower at 1300 kg/h and at 50 kg/h, respectively, through an upper portion thereof The water content with respect to the EVAc was about 1500 ppm. Furthermore, methanol vapor at 115° C. was blown into the tower at 1100 kg/h through a lower portion thereof, and methyl acetate formed as a by-product was distilled through a top portion of the tower with some of the methanol. At this time, the temperature in the tower was between 110° C. and 115° C., the pressure in the tower was 5.5 kg/cm$^2$ (about 0.54 MPa), and the residence time of the materials in the tower was 30 minutes. Thus, a methanol solution of EVOH having a saponification degree of 99.5 mol % was obtained through a bottom portion of the tower.

Vapor of a water-methanol mixture was further blown into this solution to distill the vapor of the water-methanol mixture, and an EVOH solution (EVOH concentration: 35 wt %) of a methanol-water mixed solvent (methanol/water= 65/35; weight ratio) was obtained. This solution was discharged into a coagulation bath comprising a methanol-water mixed solvent (methanol/water=10/90; weight ratio) at 5° C. through a die with apertures of 2 mm in diameter, and coagulated in the form of strands. The strands were cut by a cutter so as to obtain pellets with a length of 2.5 to 3.5 mm. These EVOH pellets were washed with 15 weight parts of water with respect to 1 weight part of the pellets, and deliquored. Subsequently, the pellets were treated with an aqueous solution of acetic acid and sodium dihydrogenphosphate, deliquored, and further dried. Thus, EVOH having a saponification degree of 99.5 mol % and a melt index of 2.1 g/10 min was obtained. The yellow index of this EVOH was measured according to Japanese Industrial Standard (JIS) K 7103. The yellow index was 15.

Example 2

Except that the ethylene content in the EVAc used was changed to 52 mol %, and that the water content in the methanol solution of sodium hydroxide fed into the tower through an upper portion thereof was 0.86 wt %, and the feed rate of the methanol solution of sodium hydroxide was 100 kg/h, saponification was carried out in the same manner as in Example 1. The water content with respect to the EVAc was about 1500 ppm. The obtained EVOH had a saponification degree of 99.0 mol % and a yellow index of 18.

Example 3

Except that the water content in the methanol solution of sodium hydroxide fed into the tower through an upper portion thereof was 5.8 wt %, saponification was carried out in the same manner as in Example 1. The water content with respect to the EVAc was about 5000 ppm. The obtained EVOH had a saponification degree of 96 mol % and a yellow index of 10.

Comparative Example 1

Except that the water content in the methanol solution of sodium hydroxide fed into the tower through an upper portion thereof was 0.04 wt %, saponification was carried out in the same manner as in Example 1. The water content with respect to the EVAc was about 50 ppm. The obtained EVOH had a saponification degree of 99.6 mol % and a yellow index of 30, and also showed a yellowish hue when observed with the naked eye.

Comparative Example 2

Except that the water content in the methanol solution of sodium hydroxide fed into the tower through an upper portion thereof was 35 wt %, saponification was carried out in the same manner as in Example 1. The water content with respect to the EVAc was about 30,000 ppm. However, because the rate of the saponification reaction was extremely slow, the saponification had to be discontinued.

As described above, according to the present invention, appearances of an EVOH molded product can be improved by adding a predetermined amount of water in a saponification process. According to the method of the present invention, the properties of a product can be improved without extensive modification in a conventional saponification reaction apparatus or saponification process, and its utility value in the present technical field is very high.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for producing a saponified ethylene-vinyl acetate copolymer, which comprises saponifying an ethylene-vinyl acetate copolymer in an alcohol-based solvent in the presence of an alkali catalyst until its saponification degree is at least 98 mol %, wherein from 100 ppm to 15,000 ppm of water (based on the ethylene-vinyl acetate copolymer) is added to the alcohol-based solvent, and wherein a first solution comprising an ethylene-vinyl acetate coplymer and an alcohol-based solvent and a second solution comprising an alkali catalyst and an alcohol-based solvent are introduced into a saponification reaction column through an upper portion thereof, and a vapor of alcohol-based solvent is introduced into the saponification reaction column through a lower portion thereof.

2. The method according to claim 1, wherein water is fed into the saponification reaction column with the second solution.

3. The method according to claim 1, wherein the ethylene content in the ethylene-vinyl acetate copolymer is from 20 mol % to 70 mol %.

4. The method according to claim 1, wherein the alcohol in the alcohol-based solvent is one or more selected from the group consisting of methanol, ethanol, n-butanol, and t-butanol.

5. The method according to claim 1, wherein the alkali catalyst is selected from the group consisting of sodium hydroxide, potassium hydroxide, and alkaline metal alcoholate.

6. The method according to claim 1, wherein from 100 ppm to 3000 ppm of water (based on the ethylene-vinyl acetate copolymer) is added to the alcohol-based solvent.

* * * * *